United States Patent [19]

Nakashima et al.

[11] Patent Number: 5,542,841
[45] Date of Patent: Aug. 6, 1996

[54] BURNER APPARATUS FOR USE IN A GLASS FURNACE

[75] Inventors: Takashi Nakashima; Masanobu Kodera, both of Shinnanyo, Japan

[73] Assignee: KYC, Inc., Shinnanyo, Japan

[21] Appl. No.: 317,583

[22] Filed: Oct. 3, 1994

[51] Int. Cl.⁶ .................................................. F23D 11/36
[52] U.S. Cl. .................. 431/160; 431/159; 126/343.5 R; 126/343.5 A
[58] Field of Search .................................... 431/160, 159; 126/343.5 R, 343.5 A

[56] References Cited

FOREIGN PATENT DOCUMENTS

| 0114070 | 7/1984 | European Pat. Off. . |
| 0297955 | 1/1989 | European Pat. Off. . |
| 1384827 | 11/1964 | France . |
| 2644558 | 9/1990 | France . |
| 3218392 | 11/1983 | Germany . |
| 61-13136 | 1/1986 | Japan . |
| WO84/00176 | 1/1984 | WIPO . |

*Primary Examiner*—Larry Jones
*Attorney, Agent, or Firm*—Oblon, Spivak, McClelland, Maier & Neustadt, P.C.

[57] ABSTRACT

A burner apparatus is used in a glass furnace incorporating a plurality of pairs of burners, each pair of burners being provided at the diametrically opposite locations of the furnace and operated alternately. The burner apparatus comprises a water cooled wall located in an opening of a burner tile, a cooling water supply device for supplying cooling water to the backside surface of the water cooled wall, and an opening formed in the water cooled wall. The forward end portion of a fuel injection nozzle provided on the forward end of the burner is fitted in the opening formed in the water cooled wall.

8 Claims, 7 Drawing Sheets

F I G. 4
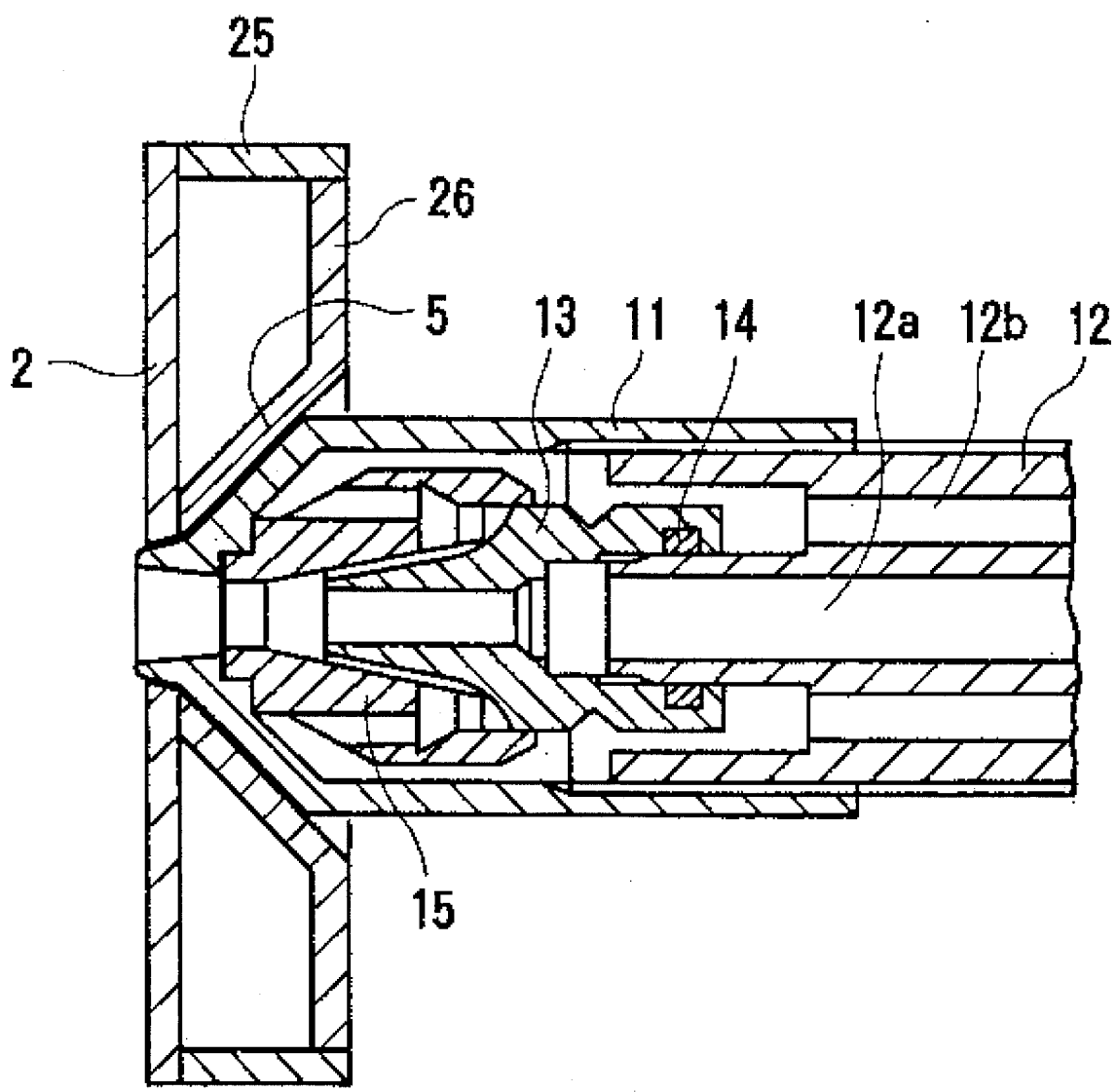

F I G. 7
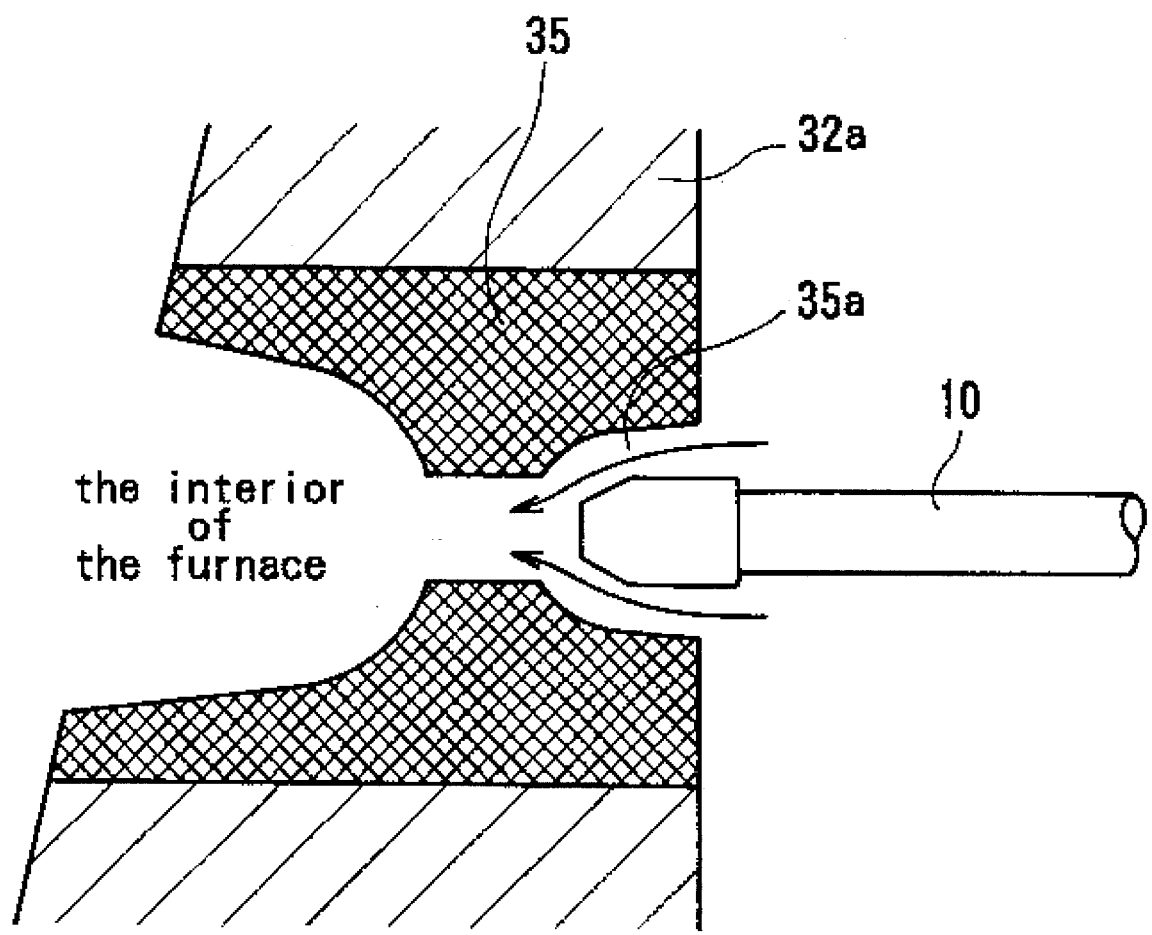

BURNER APPARATUS FOR USE IN A GLASS FURNACE

BACKGROUND OF THE INVENTION

1. Field of the Invention

The present invention relate to a burner apparatus for use in a glass furnace, and more particularly to a burner apparatus which is used in a glass furnace incorporating a plurality of pairs of burners, each pair of burners being provided at the diametrically opposite locations of the furnace and operated alternately, and which is suitable for overheat protection of the burner which is not in operation.

2. Description of the Related Art

In a glass furnace for melting large batches of glass, a plurality of pairs of burners are provided to form a flame over the glass surface. FIG. 6 shows a conventional glass furnace 32 which incorporates a plurality of pairs of burners. Each pair of burners 10 is provided at the diametrically opposite locations of the glass furnace 32. A combustion air supply opening 33 is formed slightly above each of the burners 10, and a regenerative heat exchanger 34 is installed at the combustion air supply opening 33.

In the glass furnace 32 of the above structure, when using the burner 10 on the left side of the furnace, combustion air is supplied through the combustion air supply opening 33 and the heat exchanger 34 on the left side of the furnace, and exhaust heat is recovered by the heat exchanger 34 on the right side of the furnace. When using the burner 10 on the right side of the furnace, combustion air is supplied through the combustion air supply opening 33 and the heat exchanger 34 on the right side of the furnace, and exhaust heat is recovered by the heat exchanger 34 on the left side of the furnace. In this manner, the burner 10 and the heat exchanger 34 on either side of the furnace are used alternately during operation of the glass furnace.

As a fuel which is supplied to the burner, fuel oil is usually employed. As a medium for spraying fuel oil, pressurized air is supplied to the burner 10. As shown in FIG. 7, the burner 10 is inserted into an opening 35a of a burner tile 35 which is provided in a furnace wall 32a of the glass furnace 32. A clearance is formed between the inner circumferential surface of the opening 35a and the burner 10. When spraying fuel oil from the burner 10 by pressurized air, air outside the furnace is drawn in through the clearance around the burner 10. The forward end portion of the burner 10 is cooled by the air flowing therearound. When using a pair of burners alternately, the burner which is not in operation is subject to radiation heat from the burner in operation, thus being damaged. Therefore, in order to cool the burner which is not in operation, the burner is required to eject a small quantity of pressurized air. The burner is cooled by pressurized air, and air which is drawn in from the outside of the furnace through the clearance around the burner.

However, when the burner is in operation, a large quantity of air is drawn in from the outside of the furnace through the clearance, thus lowering temperature in the furnace and thereby lowering unit requirement for fuel oil. That is, fuel consumption increases.

Therefore, it is desirable to dispense with air for cooling the burner. As a burner which does not need a cooling air, there has heretofore been proposed a burner jacket in Japanese laid-open utility model publication No. 61-13136. According to the disclosed arrangement, a burner has a forward end portion composed of a water cooled double pipe whose tip end contacts a burner tile.

However, in the burner disclosed in the above publication, a front surface of the forward end of the burner facing the interior of the furnace is not cooled by cooling water, thus the front surface of the burner is elevated to a high temperature. As a result, carbon in fuel oil sticks to the interior of the burner and blocks up fuel oil passage, and a desired flame is not formed in the furnace. Therefore, maintenance works are frequently required to remove carbon which sticks to the interior of the burner after detaching the burner from the furnace. When detaching the burner from the furnace, maintenance workers are exposed to radiation heat from the opening of the burner tile.

SUMMARY OF THE INVENTION

It is therefore an object of the present invention to provide a burner apparatus for use in a glass furnace which can dispense with cooling air for a burner and prevents carbon from sticking to the forward end portion of the burner.

According to the present invention, there is provided a burner apparatus for use in a glass furnace comprising: a water cooled wall located in an opening of a burner tile, the water cooled wall having a front surface facing an interior of the glass furnace and a backside surface; cooling water supply means for supplying cooling water to the backside surface of the water cooled wall; and an opening formed in the water cooled wall; wherein a forward end portion of a fuel injection nozzle provided on a forward end of a burner is fitted in the opening formed in the water cooled wall.

According to the present invention, the water cooled wall is inserted into the opening of the burner tile, and the forward end portion of the fuel injection nozzle of the burner is fitted in the opening of the water cooled wall. The opening of the water cooled wall has a small inner diameter that is not greater than the diameter of the forward end portion of the fuel injection nozzle. The forward end portion of the burner which is not in operation is located at the backside of the water cooled wall, and thus is not subject to radiation heat from a flame formed by the burner which is in operation.

The above and other objects, features, and advantages of the present invention will become apparent from the following description of illustrative embodiments thereof to be read in conjunction with the accompanying drawings.

BRIEF DESCRIPTION OF THE DRAWINGS

FIG. 4 is a cross-sectional view taken along line IV—IV of FIG. 3;

FIG. 7 is a cross-sectional view showing the relationship between a burner tile and a burner in the conventional burner.

DETAILED DESCRIPTION OF THE PREFERRED EMBODIMENTS

A burner apparatus for use in a glass furnace of the present invention will be described below with reference to drawings.

Figure 1:
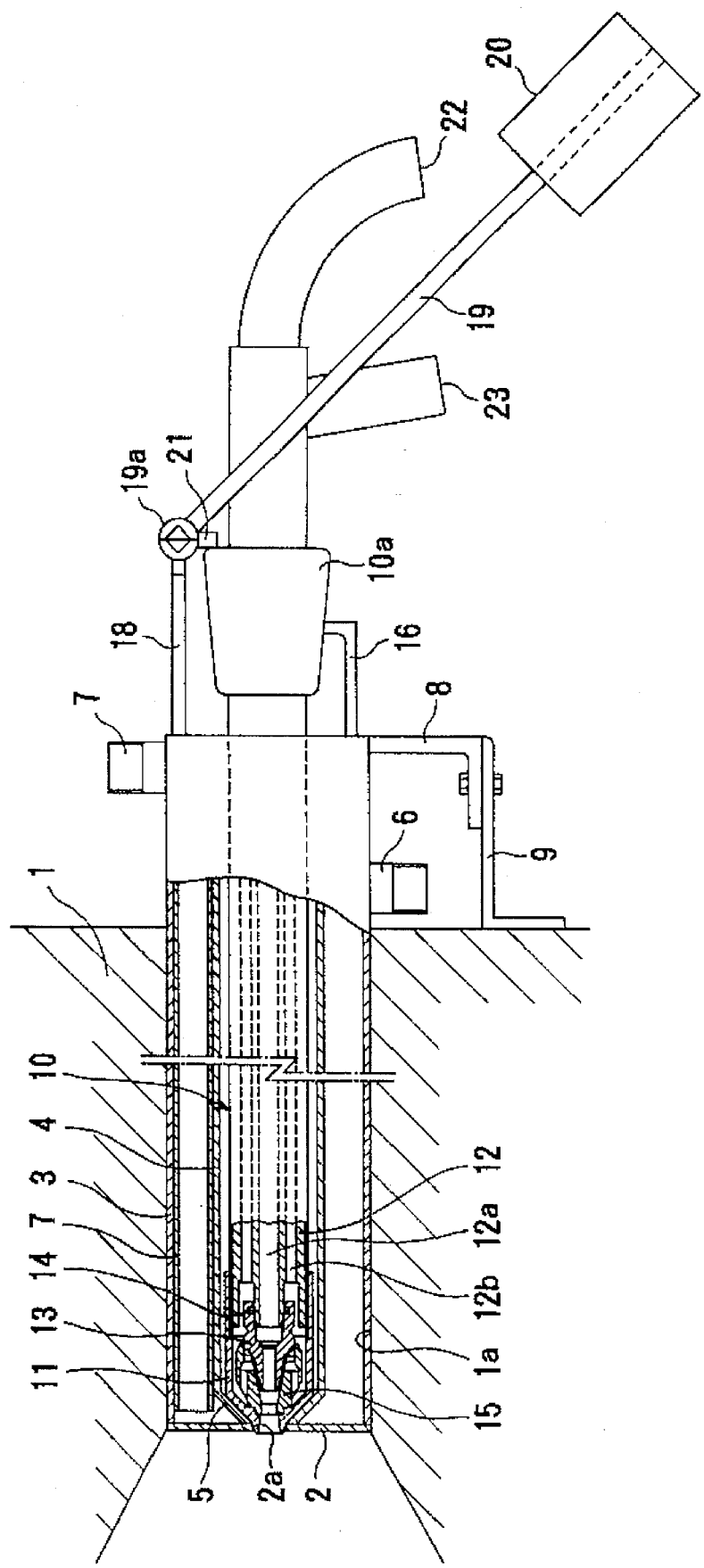
FIG. 1 is a side view partly in section of a burner apparatus for use in a glass furnace according to a first embodiment of the present invention.
Figure 2:
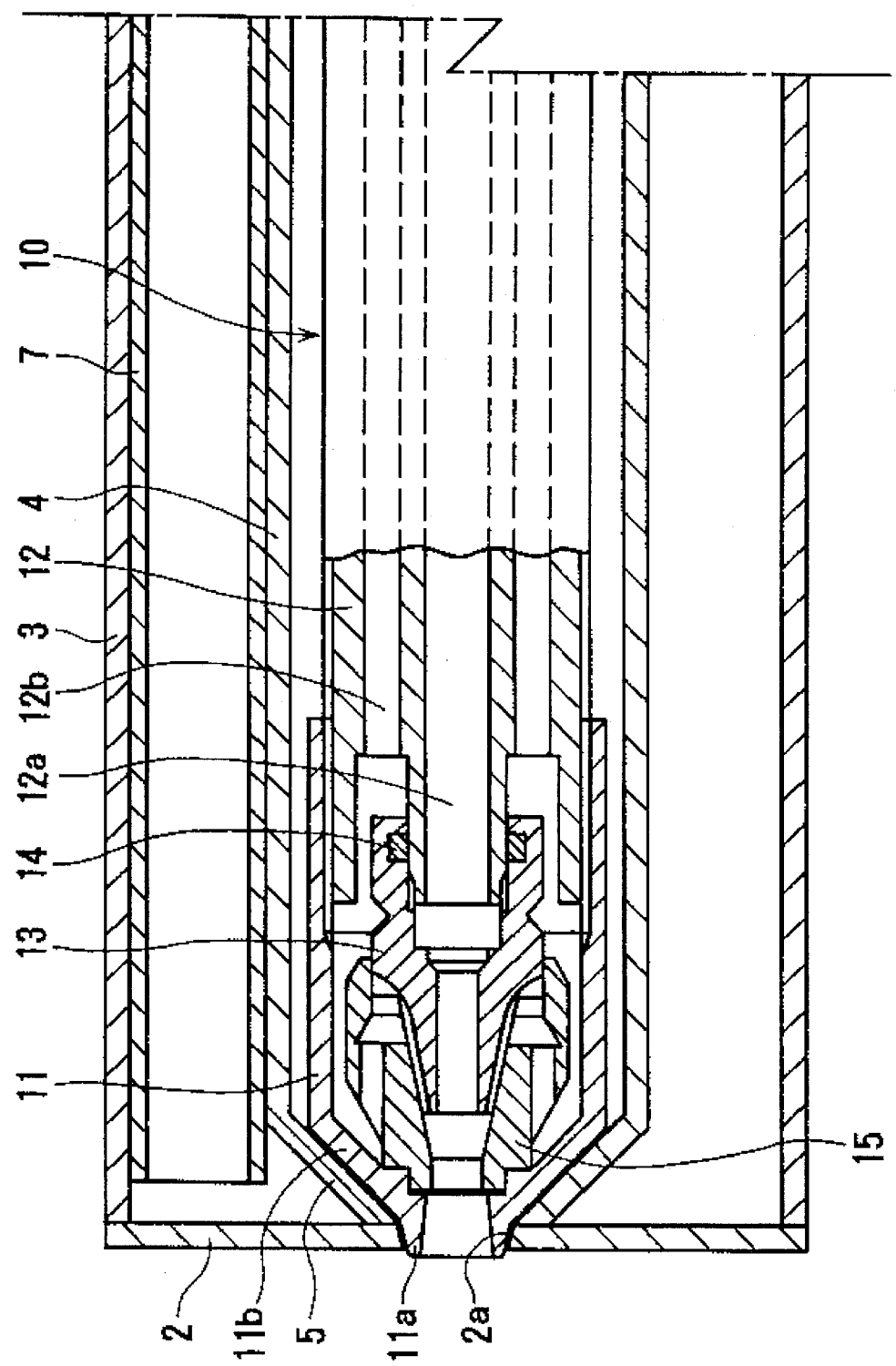
FIG. 2 is an enlarged detailed sectional view of FIG. 1.

FIGS. 1 and 2 show a first embodiment of a burner apparatus for use in a glass furnace. As shown in FIGS. 1 and 2, burner tiles are provided in a furnace wall of a glass furnace. The burner tile 1 has an opening 1a into which a water cooled wall 2 is inserted. The water cooled wall 2 has a front surface which faces the interior of the glass furnace and a backside surface which is connected to the forward end of a cylindrical water cooled cylinder 3. An opening 2a is formed at the central portion of the water cooled wall 2. A cylindrical inner cylinder 4 is housed in the water cooled cylinder 3. A tapered portion 5 is integrally formed on the forward end of the inner cylinder 4. The tapered portion 5 has a forward end which is connected to the water cooled wall 2 in the vicinity of the opening 2a.

A cooling water inlet 6 which is communicated with a cooling water source (not shown) and a cooling water outlet 7 are provided on the rear side of the water cooled cylinder 3. The cooling water outlet 7 extends from the rear side of the water cooled cylinder 3 to the vicinity of the upper part of the water cooled wall 2. The cooling water introduced from the cooling water inlet 6 flows through a space between the water cooled cylinder 3 and the inner cylinder 4, contacts the backside surface of the water cooled wall 2 and cools the water cooled wall 2, and is then discharged from the cooling water outlet 7. A supporting member 8 is fixed to the rear end of the water cooled cylinder 3, and a bracket 9 is fixed to the outer wall of the burner tile 1. The water cooled cylinder 3 is removably held by the burner tile 1 by fixing the supporting member 8 to the bracket 9.

A burner 10 is inserted into the water cooled cylinder 3. The burner 10 has a fuel injection nozzle 11 at the forward end thereof. The fuel injection nozzle 11 has a forward end portion 11a which is fitted into the opening 2a of the water cooled wall 2. Further, the fuel injection nozzle 11 has a tapered portion 11b which is fitted into the tapered portion 5 formed on the forward end of the inner cylinder 4. The fuel injection nozzle 11 is threadingly engaged with a fuel and air supplying member 12 which has an oil passage 12a and a pressurized air passage 12b. A swirler 13 is fixed to the forward end of the fuel and air supplying member 12 through an O ring 14. A choke 15 is fitted over the swirler 13. The burner 10 has a truncated cone portion 10a at the rear side thereof. On the rear end of the water cooled cylinder 3, there is provided a support 16 which supports the truncated cone portion 10a of the burner 10. A presser bar holding member 18 is fixed to the rear end of the water cooled cylinder 3. A presser bar 19 having a weight 20 is rotatably supported by the forward end of the presser bar holding member 18.

Since the presser bar 19 rotates around the forward end of the presser bar holding member 18 by the weight 20, a pin 21 provided at a base portion 19a of the presser bar 19 is engaged with the rear end of the truncated cone 10a, thereby pushing the burner 10 forward. Therefore, the burner 10 is held by the water cooled cylinder 3, and the forward end portion 11a of the fuel injection nozzle 11 is tightly fitted into the opening 2a of the water cooled wall 2 and the tapered portion 11b is tightly fitted in the tapered portion 5 of the inner cylinder 4.

An oil inlet 22 and a pressurized air inlet 23 are formed at the rear end of the burner 10. The oil inlet 22 and the pressurized air inlet 23 are communicated with the oil passage 12a and the pressurized air passage 12b of the fuel and air supplying member 12, respectively.

According to the first embodiment of the present invention, the water cooled wall 2 is inserted into the opening 1a of the burner tile 1, and the forward end portion 11a of the fuel injection nozzle 11 of the burner 10 is fitted in the opening 2a of the water cooled wall 2. The opening 2a of the water cooled wall 2 has a small inner diameter that is not greater than the diameter of the forward end portion 11a of the fuel injection nozzle 11. The forward end portion of the burner 10 which is not in operation is located at the backside of the water cooled wall 2, and thus is not subject to radiation heat from a flame formed by the burner which is in operation. It goes without saying that the forward end portion of the burner 10 which is in operation is also cooled by the water cooled wall 2.

Further, according to the first embodiment of the present invention, since the tapered portion 11b of the fuel injection nozzle 11 is tightly fitted in the tapered portion 5 of the inner cylinder 4 which is cooled by cooling water, a high cooling effect of the fuel injection nozzle 11 is obtainable. The burner 10 is entirely held by the water cooled cylinder 3 having the support 16 and the presser bar 19.

By raising the presser bar 19 upward, inserting the burner 10 into the water cooled cylinder 3 and then lowering the presser bar 19, the burner 10 is held by the water cooled cylinder 3. Accordingly, the burner 10 can be easily installed on the furnace or detached from the furnace.

Figure 3:
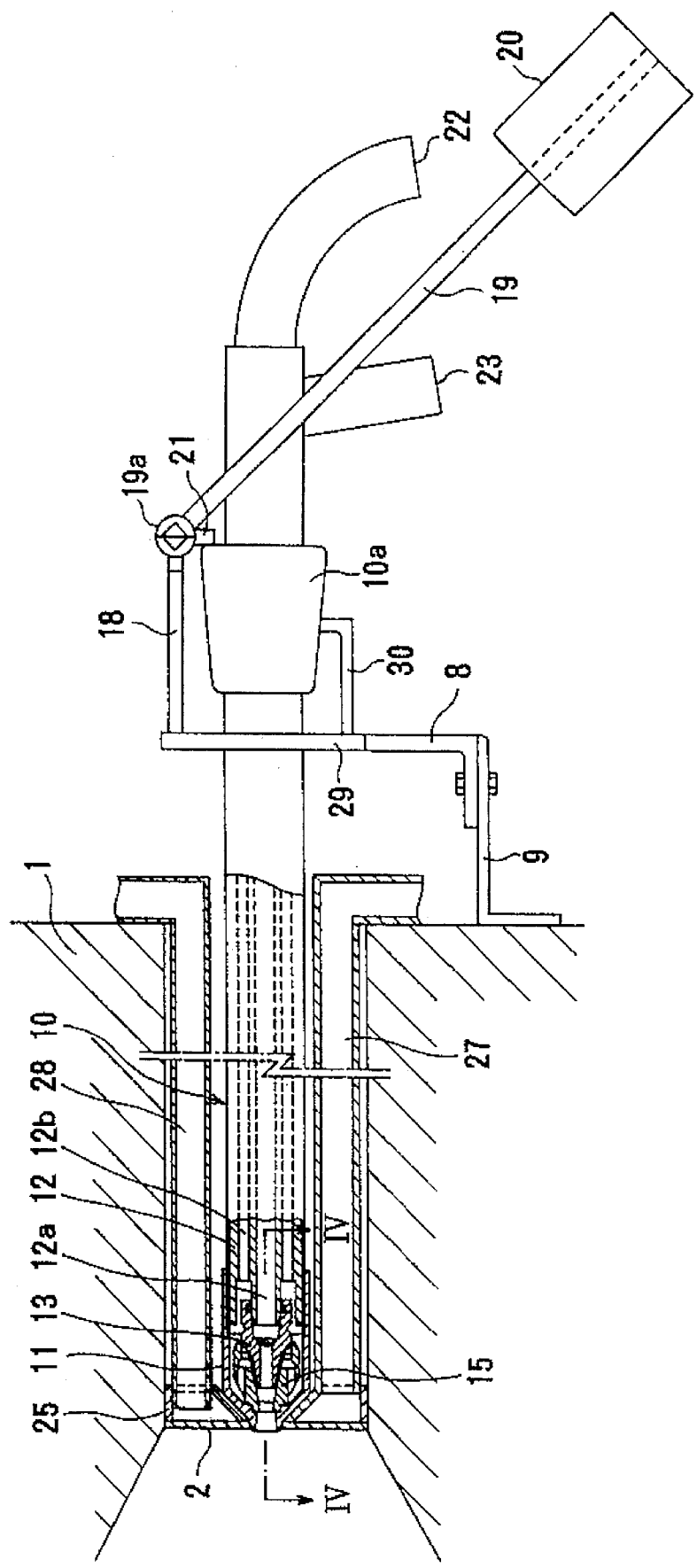
FIG. 3 is a side view partly in section of a burner apparatus for use in a glass furnace according to a second embodiment of the present invention.

FIGS. 3 and 4 show a second embodiment of the present invention. In this embodiment, the water cooled wall 2 has the same structure as that in the first embodiment in FIGS. 1 and 2. However, a water cooled cylinder for supporting the water cooled wall 2 is not provided. As shown in FIGS. 3 and 4, a short outer cylinder 25 is fixed to the outer periphery of the water cooled wall 2. An annular back plate 26 is fixed to the rear end of the outer cylinder 25. The back plate 26 has a tapered portion 5 which is connected to the water cooled wall 2. A closed space is formed by the water cooled wall 2, the outer cylinder 25, the back plate 26 and the tapered portion 5. The lower part of the closed space is communicated with a cooling water supply pipe 27, and the upper part of the closed space is communicated with a cooling water discharge pipe 28. The cooling water introduced from the cooling water supply pipe 27 flows in the closed space, contacts the backside surface of the water cooled wall 2 and cools the water cooled wall 2, and is then discharged from the cooling water discharge pipe 28.

Further, a holding member 29 is provided to hold the rear side of the burner 10, and a support 30 is fixed to the holding member 29. The supporting member 8 and the presser bar holding member 18 having the same structure as those of FIGS. 1 and 2 are fixed to the holding member 29. The burner 10 is held by the burner tile 1 by fixing the supporting member 8 to the bracket 9 fixed to the outer wall of the burner tile 1. The presser bar 19 having the weight 20 is rotatably supported by the forward end of the presser bar holding member 18, and the burner 10 is pushed forward by the presser bar 19. The other details of the burner apparatus in FIGS. 3 and 4 are the same as the burner apparatus in FIGS. 1 and 2.

According to the second embodiment of the present invention, the water cooled wall 2 is inserted into the opening 1a of the burner tile 1, and the forward end portion 11a of the fuel injection nozzle 11 of the burner 10 is fitted in the opening 2a of the water cooled wall 2. The opening 2a of the water cooled wall 2 has a small inner diameter that is not greater than the diameter of the forward end portion 11a of the fuel injection nozzle 11. The forward end portion of the burner 10 which is not in operation is located at the backside of the water cooled wall 2, and thus is not subject to radiation heat from a flame formed by the burner which is in operation.

Figure 5:
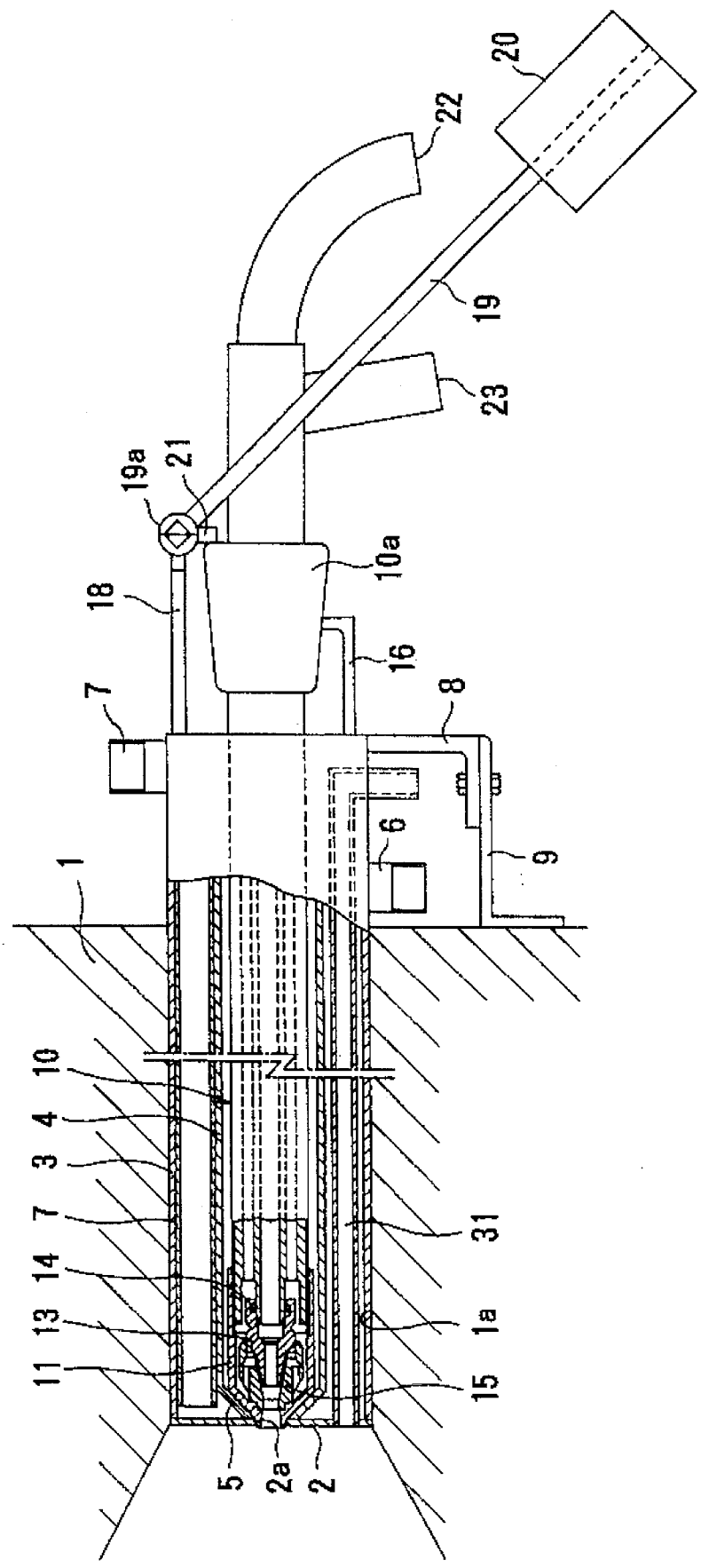
FIG. 5 is a side view partly in section of a burner apparatus for use in a glass furnace according to a third embodiment of the present invention.
Figure 6:
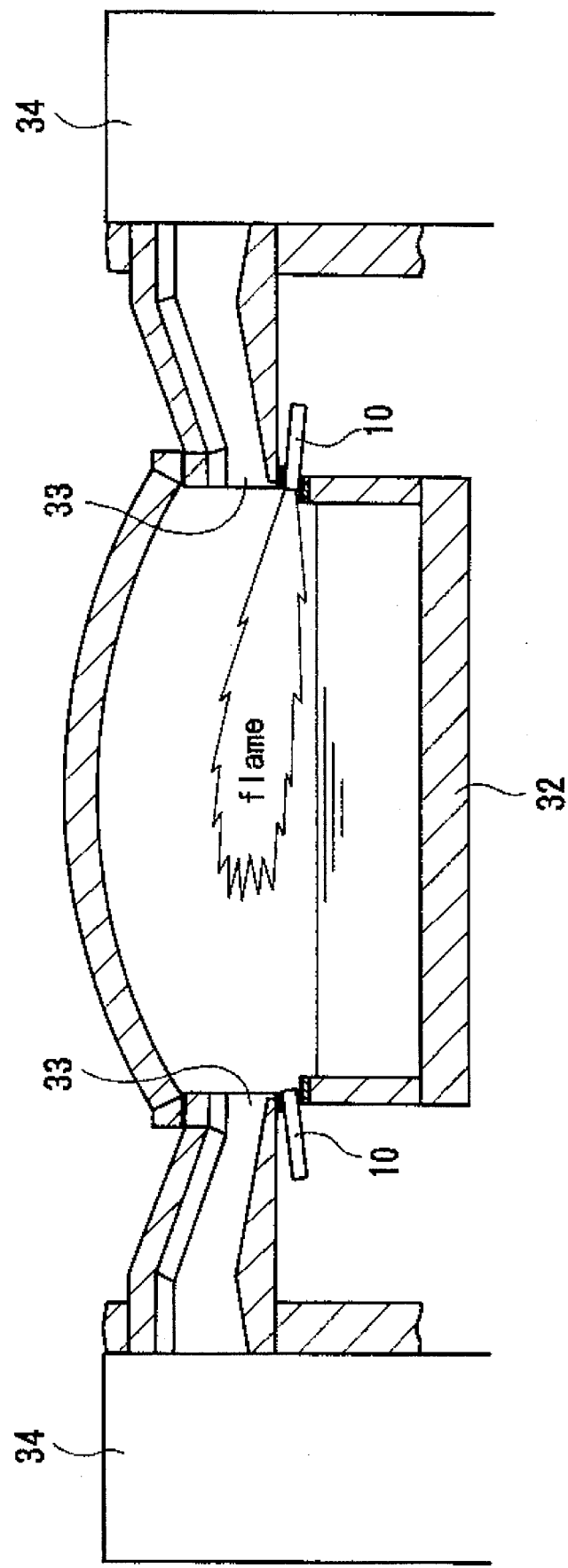
FIG. 6 is a cross-sectional view of a glass furnace which incorporates conventional burners.

FIG. 5 shows a third embodiment of the present invention. In this embodiment, an air supplying tube 31 for supplying combustion air is added to the first embodiment in FIGS. 1 and 2. That is, the air supplying tube 31 which is communicated with an air supply source (not shown) is disposed between the water cooled cylinder 3 and the inner cylinder 4. The combustion air is ejected from the air supplying tube 31 and supplied to the lower part of the flame formed by the burner 10, whereby burning velocity of the lower part of the flame is accelerated and combustion efficiency is improved.

As is apparent from the above description, according to the present invention, the water cooled wall is disposed in the opening of the burner tile, and the forward end portion of the fuel injection nozzle provided on the forward end of the burner is fitted in the opening formed in the water cooled wall. Therefore, air for cooling the burner is made unnecessary, and hence unit requirement for fuel oil can be improved.

Further, according to the present invention, the forward end portion of the burner which is not in operation is protected from radiation heat of a flame by the water cooled wall, thus carbon is prevented from sticking to the forward end portion of the burner.

What is claimed is:

1. A burner apparatus for use in a glass furnace, the burner apparatus comprising:
   a water cooled wall located in an opening of a burner tile, said water cooled wall having a front surface facing an interior of the glass furnace and a backside surface;
   cooling water supply means for supplying cooling water to said backside surface of said water cooled wall; and
   an opening formed in said water cooled wall;
   wherein a forward end portion of a fuel injection nozzle provided on a forward end of a burner extends into said opening formed in said water cooled wall so as to be fitted in said opening formed in said water cooled wall;
   said burner apparatus further comprising pressing means for pressing a rear-side of said burner forward to fit said forward end portion of said fuel injection nozzle in said opening formed in said water cooled wall.

2. The burner apparatus according to claim 1, further comprising a tapered portion connected to said backside surface of said water cooled wall and wherein said fuel injection nozzle has a tapered portion which is tightly fitted in said tapered portion connected to said backside surface of said water cooled wall.

3. The burner apparatus according to claim 1, further comprising a water cooled cylinder which is located in said opening of said burner tile and wherein said water cooled wall is provided on a forward end of said water cooled cylinder.

4. The burner apparatus according to claim 3, wherein said cooling water supply means comprises a cooling water supply pipe for supplying cooling water into said water cooled cylinder and a cooling water discharge pipe extending from a rear-side of said water cooled cylinder to the vicinity of an upper part of said water cooled wall.

5. The burner apparatus according to claim 1, further comprising an air tube for supplying combustion air to a lower part of a flame formed by said burner in said glass furnace.

6. The burner apparatus according to claim 1, further comprising holding means for holding a rear-side of said burner.

7. The burner apparatus according to claim 1, wherein said pressing means comprises a presser bar having a weight and a pin provided on a base portion of said presser bar, and said presser bar is rotatably provided so that said pin is engageable with said rear-side of said burner.

8. A burner apparatus for use in a glass furnace, the burner apparatus comprising:
   a water cooled wall positioned in an opening of a burner tile, the water cooled wall having a front surface which faces an interior of the glass furnace and a backside surface which is connected to a forward end of a cylindrical water cooled cylinder, an opening being formed in said water cooled wall;
   cooling water supply means for supplying cooling water to the backside surface of said water cooled wall;
   an inner cylinder housed in the water cooled cylinder, an inner cylinder tapered portion being formed on a forward end of said inner cylinder, said inner cylinder tapered portion being connected to the backside surface of said water cooled wall in a vicinity of the opening formed in the water cooled wall;
   a fuel injection nozzle provided on a forward end of a burner which is adapted to be positioned in said water cooled cylinder, said nozzle having a tapered portion which is fitted in said inner cylinder tapered portion and a forward end portion which extends into said opening formed in said water cooled wall so as to be fitted in said opening; and
   pressing means for pressing a rear-side of said burner forward to fit said forward end portion of said fuel injection nozzle in said opening formed in said water cooled wall.

* * * * *